United States Patent
He et al.

(10) Patent No.: US 10,991,030 B2
(45) Date of Patent: Apr. 27, 2021

(54) RENDERING A LIST IN CHRONOLOGICAL ORDER

(71) Applicant: INTERNATIONAL BUSINESS MACHINES CORPORATION, Armonk, NY (US)

(72) Inventors: Zonglin He, Keysborough (AU); Sheng Jiang, Beijing (CN); Xiao Qing Wang, Beijing (CN); Chih-Hong Wong, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 382 days.

(21) Appl. No.: 15/712,643

(22) Filed: Sep. 22, 2017

(65) Prior Publication Data

US 2019/0095979 A1   Mar. 28, 2019

(51) Int. Cl.
*G06Q 30/06* (2012.01)
*G06Q 30/02* (2012.01)

(52) U.S. Cl.
CPC ..... *G06Q 30/0633* (2013.01); *G06Q 30/0277* (2013.01); *G06Q 30/0631* (2013.01); *G06Q 30/0641* (2013.01)

(58) Field of Classification Search
CPC .......... G06Q 30/0633; G06Q 30/0277; G06Q 30/0631; G06Q 30/0641
USPC ..................... 705/14.41, 301, 14.62; 725/34; 358/1.15; 706/46
See application file for complete search history.

(56) References Cited

U.S. PATENT DOCUMENTS

| | | | |
|---|---|---|---|
| 7,779,014 B2 | 8/2010 | York et al. | |
| 8,893,014 B1 | 11/2014 | Au et al. | |
| 9,032,447 B1 | 5/2015 | Caidar et al. | |
| 9,231,996 B2 | 1/2016 | Chakra et al. | |
| 2007/0050248 A1* | 3/2007 | Huang | G06Q 30/0265 705/14.62 |
| 2007/0091357 A1* | 4/2007 | Konno | G06F 16/48 358/1.15 |
| 2008/0040341 A1* | 2/2008 | York | G06Q 30/0633 |
| 2009/0327184 A1* | 12/2009 | Nishizaki | G06F 3/0482 706/46 |
| 2015/0100503 A1* | 4/2015 | Lobo | G06Q 10/103 705/301 |
| 2015/0382042 A1* | 12/2015 | Wagenaar | H04N 21/26258 725/34 |

(Continued)

FOREIGN PATENT DOCUMENTS

| | | | |
|---|---|---|---|
| CN | 201434665 Y | * | 3/2010 |
| WO | 2015042513 A1 | | 3/2015 |

OTHER PUBLICATIONS

Kato Richardson, he Firebase Blog, 2014 (Year: 2014).*

(Continued)

*Primary Examiner* — Tarek Elchanti
(74) *Attorney, Agent, or Firm* — Kenneth Han

(57) ABSTRACT

A method, computer system, and computer program product. A list of items to be rendered on a display screen is received by a computer system. A display priority of each item in the list is determined by the computer system. Each item in the list is rendered in chronological order on the display screen, based on the determined display priority of each item in the list by the computer system.

21 Claims, 10 Drawing Sheets

(56) References Cited

U.S. PATENT DOCUMENTS

2018/0217964 A1* 8/2018 Lin .................... G06Q 30/0267

OTHER PUBLICATIONS

Mell et al., "The NIST Definition of Cloud Computing", NIST, Sep. 2011, 7 Pages, Special Publication 800-145, U.S. Department of Commerce, Gaithersburg, MD.

* cited by examiner

RENDERING A LIST IN CHRONOLOGICAL ORDER

BACKGROUND

The present disclosure relates to the field of contents display, and more specifically, to a method, system and computer program product for rendering a list in chronological order on a display screen.

Consumers obtain information from the Internet by way of content displayed by web pages, mobile applications, and the like. Where the content includes a listing of items, viewers of the content may generally only pay attention to the first several items in the listing. As such, methods for recommending certain items of listings to viewers, while maintaining efficiency, has become an increasingly important issue.

SUMMARY

Aspects of the present invention are directed to a method, system, and computer program product for rendering a list in chronological order on a display screen.

According to an aspect of the present invention, a method is provided. The method may include receiving a list for rendering on a display screen, where the list may include a number of items. A display priority of each item of the plurality of items in the list may then be determined. Each item of the plurality of items may then be rendered in chronological order on the display screen, based on the determined display priority of each item in the list. The display priority may be implemented to improve the effectiveness of advertising results provided by a business as part of search results produced by a search application. The display priority may also be implemented to reduce an amount of risk for the business, which may associated with providing the advertising results, thereby improving the effectiveness of promotional marketing efforts of the business.

According to a further aspect of the present invention, the method may include determining a time parameter for each item of the plurality of items in the list. The time parameter may be implemented to improve the effectiveness of advertising results provided by a business.

According to a further aspect of the present invention, the method may include determining a current item in a list to be rendered based on a display priority of each item in the list. The current item may then be added to a queue for rendering on the display screen. The rendering of the current item may intentionally be delayed for a period of time based on the determined time parameter for the current item. The delayed rendering may be implemented to improve the effectiveness of advertising results provided by a business.

According to a further aspect of the present invention, the method may include rendering the current item on the display screen. The rendering of the current item on the display screen may intentionally be prolonged for a period of time based on the determined time parameter for the current item. The prolonged rendering may be implemented to improve the effectiveness of advertising results provided by a business.

According to a further aspect of the present invention, the method may include ordering each item in a list based on the display priority of each item in the list, to determine a current item in the list to be rendered.

According to a further aspect of the present invention, the method may include receiving a list for rendering on a display screen, where the list may include a number of items that form two groups of items, where each of the two groups of items may include items of equal display priority.

According to a further aspect of the present invention, the method may include receiving a list for rendering on a display screen, where the list may include a number of image items, a number of video items, or a number of text items.

According to an aspect of the present invention, a computer system is provided. The computer system may include one or more computer processors, one or more computer-readable storage media, and program instructions stored on one or more of the computer-readable storage media for execution by at least one of the one or more computer processors. The program instructions may be executed to perform the disclosed method.

According to an aspect of the present invention, a computer program product is provided. The computer program product may include one or more computer-readable storage devices and program instructions stored on at least one of the one or more computer-readable storage devices for execution by at least one or more computer processors of a computer system. The program instructions may be executed by the at least one or more computer processors of the computer system to perform the disclosed method.

It is to be understood that the summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the present invention are disclosed herein for purposes of describing and illustrating claimed structures and methods that may be embodied in various forms, and are not intended to be exhaustive in any way, or limited to the disclosed embodiments. Many modifications and variations will be apparent to those of ordinary skill in the art without departing from the scope and spirit of the disclosed embodiments. The terminology used herein was chosen to best explain the principles of the one or more embodiments, practical applications, or technical improvements over current technologies, or to enable those of ordinary skill in the art to understand the embodiments disclosed herein. As described, details of well-known features and techniques may be omitted to avoid unnecessarily obscuring the embodiments of the present invention.

References in the specification to "one embodiment", "an embodiment", "an example embodiment", or the like, indicate that the embodiment described may include one or more particular features, structures, or characteristics, but it shall be understood that such particular features, structures, or characteristics may or may not be common to each and every disclosed embodiment of the present invention herein. Moreover, such phrases do not necessarily refer to any one particular embodiment per se. As such, when one or more particular features, structures, or characteristics is described in connection with an embodiment, it is submitted that it is within the knowledge of those skilled in the art to affect such one or more features, structures, or characteristics in connection with other embodiments, where applicable, whether or not explicitly described.

Figure 1:
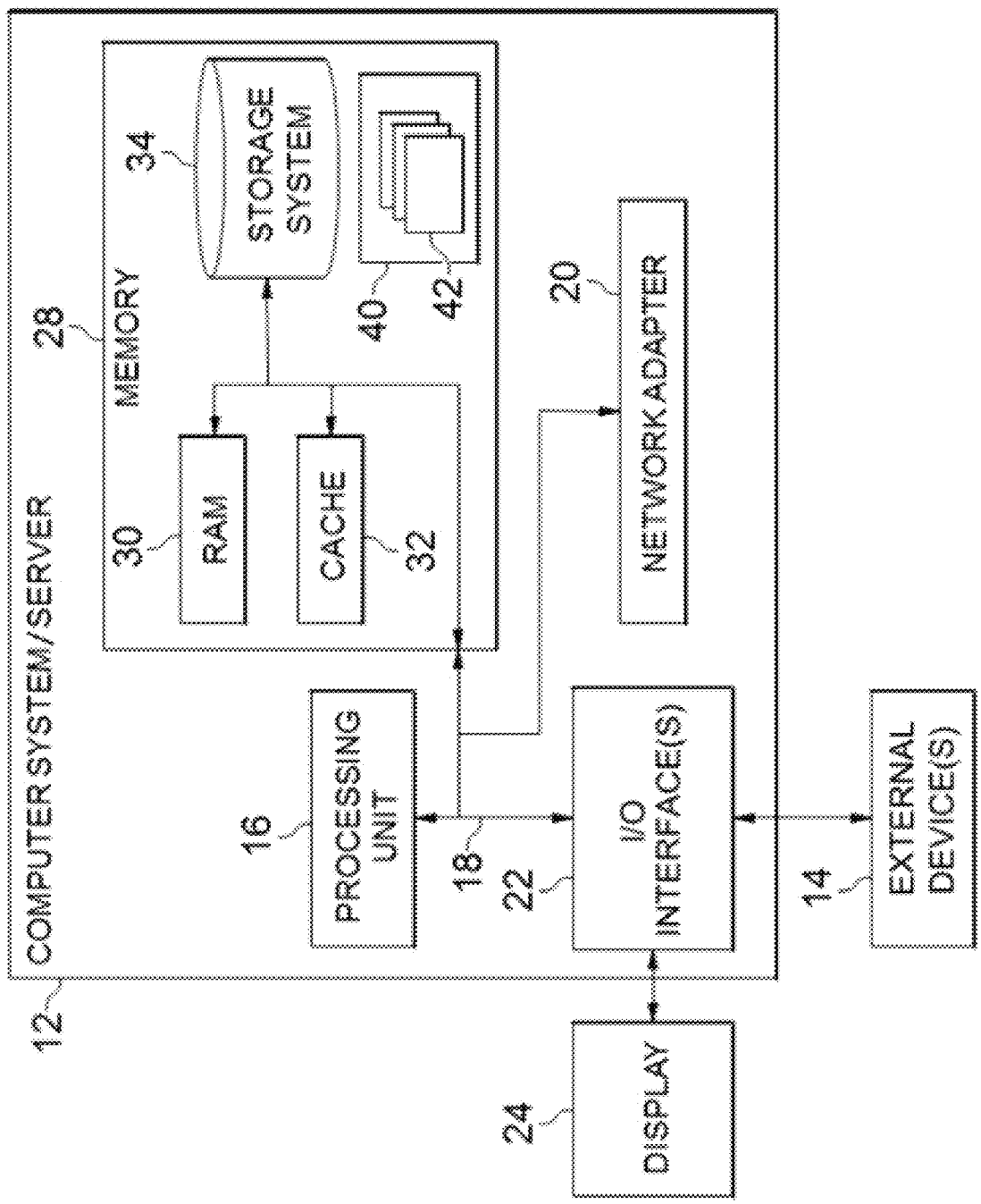
FIG. 1 is a block diagram depicting a computer system/server, in accordance with an embodiment of the present invention.

Referring now to FIG. 1, a block diagram of computer system/server 12 in accordance with an embodiment of the present invention is depicted. In the embodiment, computer system/server 12 may be, for example, a general purpose computing device, a special purpose computing device, a portable electronic device, or the like. Computer system/server 12 may include one or more processors 16, one or more system memories 28, one or more network adapters 20, and one or more Input/Output (I/O) interfaces 22, interconnected over bus 18.

Bus 18 may be implemented with any structure and architecture designed for passing data and/or control information between processors (such as microprocessors, communications and network processors, etc.), system memory, peripheral devices, and any other hardware components within a system, such as computer system/server 12. Bus 18 may be, for example, an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, or the like. Bus 18 may include, for example, a memory bus structure, a memory controller structure, a peripheral bus structure, an accelerated graphics port structure, a processor structure, a local bus structure, or the like.

Computer system/server 12 may include various computer system readable media. Such media may be any available media accessible by computer system/server 12, such as volatile media, non-volatile media, removable media, non-removable media, or the like.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media, can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, as well as an operating system, one or more application programs, other program modules, and program data, may be, for example, stored in memory 28. Each of the operating system, one or more application programs, other program modules, and program data, or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc., and any other device that may enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
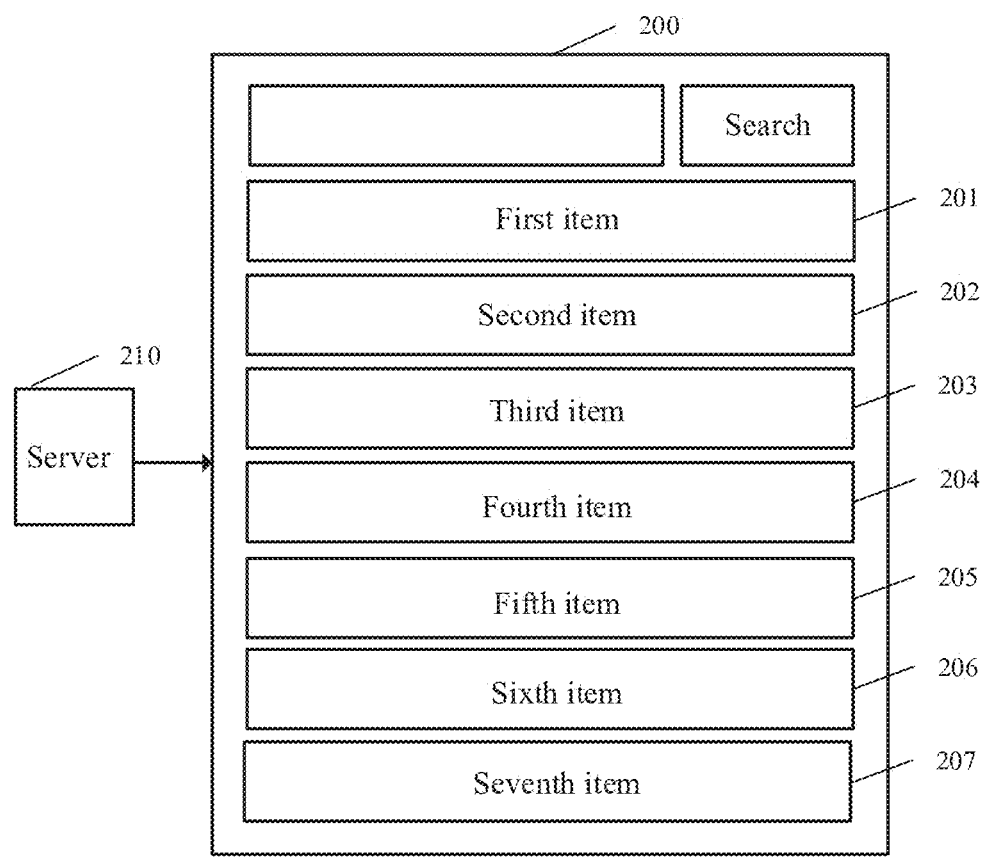
FIG. 2 is a functional block diagram depicting conventionally rendered search results on a screen.

There is a large amount of rich content in web pages, mobile applications, and the like. In some instances, the large amount of rich content can be regarded as a list, comprising a plurality of items which can be rendered on a display screen to form part of a web page. Each item in the list can be an image, text, video, or some combination thereof. The list can be obtained or sourced by a web page or a web application so as to be rendered on the screen. For example, search results produced by a search application can take the form of a list of items, where each item in the list of items can be a search result to be rendered. FIG. 2 shows rendered search results on a screen 200, as received from server 210, which may host a search application. Screen 200 may include, or may otherwise be used to display: a web page, a web application, a browser, a mobile application, or the like, and may be referred to as such accordingly throughout the present disclosure. Referring to FIG. 2, the 7 items of search results, i.e. items 201, 202, 203, 204, 205, 206 and 207, are received from server 210 and displayed in the web page 200 in a searched order. The searched order is defined by the search application. For most of the search applications, a keyword auction, also known as a sponsored search auction, may be used by a business for promotional marketing or advertising purposes, to provide advertising results. However, use of the advertising results so produced may inherently include a level of risk for the business, as the advertising results may potentially be negatively perceived by people, including viewers or consumers. The negative perception may negatively affect promotion of the business, and also harm brand image of the search application in turn, as people may be led to believe that the search results produced by the search application lack accuracy and/or authority.

Ordinarily, items 201-207, as displayed in the searched order, are rendered on the screen 200 simultaneously using static rendering techniques and technologies. In an embodiment of the present invention, a temporal dimension can be added or incorporated to the rendering and display of the plurality of items in the list. In the embodiment, the list may form part of, for example, a web page, a web application, a browser, a mobile application, or the like. The list may be rendered using, for example, dynamic rendering techniques and technologies. In the embodiment, the items in the list may be rendered, for example, in an ordered sequence, such as in chronological order, or the like, where each item may have a display priority related to its display or rendering order. In an example, an item in the list including a top display priority may be rendered first, with other items in the list being rendered sequentially according to respective display priority. In the example, the higher the display priority of an item in the list, the sooner it will be rendered, relative to other items in the list. Dynamically rendering a list of items, as provided by the present disclosure, enables promotional marketing or advertising that can provide advertising results to viewers or consumers that are less likely to be negatively perceived. The advertising results may be used to create subliminal stimuli to provide a psychological suggestion to the viewers or consumers, encouraging increased clicking rates with respect to the advertising results, thereby improving promotional marketing or advertising efforts.

Referring to FIG. 2, when a user submits a browser or search request to web application 200, server 210, which may host the search application, may collect related contents page by page. Before the search application returns search results back to the client by way of web application 200, the search results being in the form of, for example, a page having contents including items of a list in searched order, the search application can check whether "promotion in display order," or the like, with respect to items in the list, is requested. If promotion in display order is not requested, the list can be rendered conventionally, as shown in FIG. 2. Otherwise, the method for rendering the list in chronological order, as disclosed by the present disclosure, can be implemented.

Figure 3:
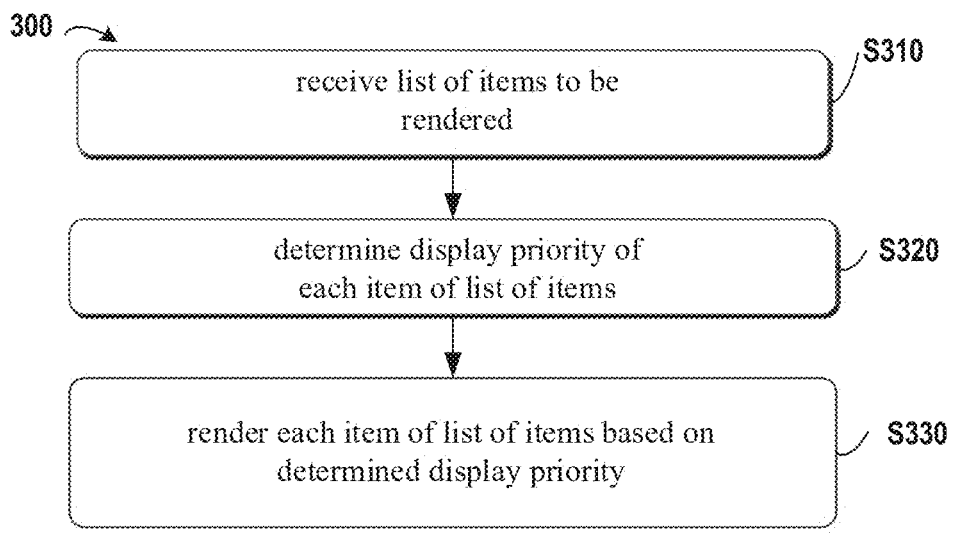
FIG. 3 is a flowchart depicting operational steps for rendering a list in chronological order, in accordance with an embodiment of the present invention.

FIG. 3 is a flowchart depicting operational steps 300 for rendering a list in chronological order, in accordance with an embodiment of the present invention. At step S310, the process may begin when a list to be rendered is received. The list may comprise a plurality of items to be rendered on a display screen, such as screen 200. The plurality of items in the list may have any kind of data structure. At step S320, if a promotion in display order is requested, the display priority of each item in the list may be determined. At step S330, each item of the plurality of items in the list may be rendered in chronological order on screen 200, in accordance with the determined display priority of each item.

In certain embodiments of the present invention, operational steps 300 may be executed by a display controller of server 210. In the certain embodiments, the operational steps 300 may be executed by a client such as a web browser, a web application, a plug-in of a web browser in the client, or the like.

In certain embodiments of the present invention, the display priority of each item of a plurality of items in a list may be determined by an administrator of the search application. In an example, a vendor of the search application may require that an owner of particular items in the list that have higher display priorities, relative to other items in the list, provide greater compensation. In the example, the display priority may then be determined by the administrator in accordance with an amount of provided compensation.

In certain embodiments of the present invention, the display priority of each item in a list may be determined by a display priority determining module of the search application server 210 (not shown in FIG. 2). In an embodiment, collaborative filtering approaches may be used to determine the display priority of each of the items. The collaborative filtering approaches may, for example, build a model of user behavior based on past behavior of a user, with respect to items previously purchased by the user, items previously selected by the user, ratings given to the items by the user, and the like. The model of user behavior may further be based on similar past behavior of other users as well. The model of user behavior may be used to, for example, predict a likelihood that the user may have an interest in a particular item, and further, may be used to predict a rating the user might give to the item. The likelihood of the interest in, or the rating of, the item may be used as the display priority for the item. The client may receive the display priority of each item from the search application, accordingly.

In certain embodiments of the present invention, the display priority of each item in a list may be determined by a display priority determining module of the search application server 210. In an embodiment, content-based filtering approaches may be used to determine the display priority of each of the items. In the embodiment, the content-based filtering approaches may utilize discrete characteristics of each of the items to recommend other items having similar characteristics. In an example, a search for a book named "Jane Eyre" in an e-commerce website, which may include many distinct suppliers offering to sell the exact same book (e.g., same publisher, etc.), may produce search results in which items relating to the book may have the same display priorities. In another, similar example, the book provided by the higher level supplier may have a higher display priority, and so on. The client may receive the display priority of each item from the search application, accordingly.

In certain embodiments of the present invention, the display priority of each item in a list may be determined by a display priority determining module of the search application server 210. In an embodiment, personality-based approaches may be used to determine the display priority of each item. The personality-based approach may derive product and service preferences from a user's personality. That is, if an item is within the scope of the user's preferences, the display priority for this item may be higher. In an example, a user may search for a book about cooking, and the user's personality may indicate a preference for both Japanese food and cold food. In the example, an item related to a book for making sushi may have the highest display priority, an item related to a book for making ice cream may have an intermediate display priority, and an item related to a book for making Chinese food may have a low display priority. The client may receive the display priority of each item from the search application, accordingly.

In certain embodiments of the present invention, the display priority of each item in a list may be determined based on all or some of the aspects of the above aforementioned models. In the certain embodiments, each of the models may provide a sub-display priority of an item in the list, and each model may include a corresponding decision weight. In the certain embodiments, the final display priority of an item in the list may be determined using the sub-display priorities of the item from each model with respect to each model's decision weights. The display priority of each item may be, for example, an integer, a decimal, or any other data type which may be mapped to an integer, or a decimal.

Figure 4:
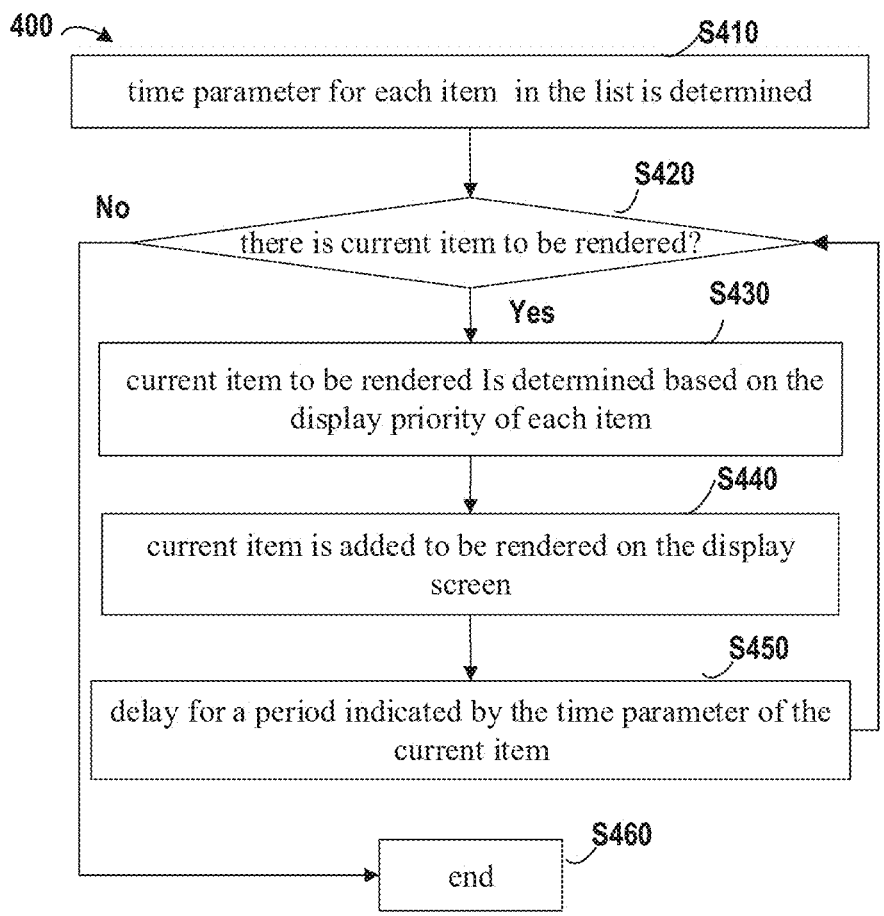
FIG. 4 is a flowchart depicting operational steps for rendering a list in chronological order in a client, in accordance with an embodiment of the present invention.

FIG. 4 is a flowchart depicting operational steps 400 for rendering a list in chronological order in a client, in accordance with an embodiment of the present invention. At step S410, a time parameter for each item of a plurality of items in the list can be determined. At step S420, a determination as to a current item in the list to be rendered is made. At step S430, where there is a current item to be rendered, the determination as to the current item (i.e., with respect to an identity of the current item) to be rendered is made based on a display priority of the current item, relative to respective display priorities of other of the plurality of items in the list. In certain embodiments of the present invention, determining the current item to be rendered may be achieved by sorting or ordering each item in the list according to respective display priority. In the certain embodiments, the determination, with respect to the current item to be rendered, may then be made based on a relative display order of the current item with respect to the display order of each other item in the list. In an example, the display priorities of the items 201, 202, 203, 204, 205, 206, and 207, as shown in FIG. 2, may be 0.4, 0.2, 0.5, 0.6, 0.1, 0.3, and 0.2, respectively. In the example, the corresponding display order of the items, from first to last, as determined based on the display priorities, may then be 204, 203, 201, 206, 202 and 207, and 205. In the example, the items having the same, or equal, display priorities may, as a result, have the same, or equal, display orders. In various embodiments, the current item in the list to be rendered may be determined "directly," based on the display priority of the current item, relative to each other item in the list. In an example, an item in a list having a highest relative display priority may be determined to be the current item to be rendered. In the example, after the current item is processed, an item having the next highest relative display priority may be determined to be the next current item to be rendered, and so on. The display order as described may be applied to the following examples of the present disclosure.

In certain embodiments of the present invention, the time parameter for an item in a list may define a holding time for the item with respect to its rendering on, for example, a display screen, during which only the item may be rendered. In the certain embodiments, the time parameter for an item in a list may define an intentional prolonging time, a maintaining time, or the like. In the certain embodiments, a state or condition of the display screen, with respect to the item, may otherwise be held constant or static. In other words, the holding time for the item may intentionally define a period or span of time during which the item may be rendered, and during which time no other item in the list may be rendered. In the certain embodiments, the time parameter for an item in a list may otherwise, or additionally, define a delay time with respect to its rendering and a subsequent rendering of another item in the list.

The delay time or the holding time may be defined to be a span of time longer than that of a person's persistence of vision, which may be at least 0.1 seconds, to allow for the person to perceive an order, such as a chronological order, in which items in a list may be rendered. Persistence of vision generally refers to an optical illusion in which a visual perception of an object by a person does not cease for some time, even after light proceeding from the object has ceased entering into the eyes of the person. In certain embodiments of the present invention, the relationship between the time parameter for each item and the display priority of each item may be linear. In an example, the time parameter for each item in a list may be 0.1 seconds. In the example, similar to a previously described example, the display priorities of the items 201, 202, 203, 204, 205, 206, and 207, as shown in FIG. 2, may be 0.4, 0.2, 0.5, 0.6, 0.1, 0.3, and 0.2, respectively, and the corresponding display order of the items may be 204, 203, 201, 206, 202 and 207, and 205. In the example, a determined time parameter for each of the items 204, 203, 201, 206, 202 and 207, and 205, may each be 0.1 seconds.

In certain embodiments of the present invention, the time parameter for each item in a list may be determined based on a respective display priority of each of the items. In an example, a determined time parameter for each of the items 204, 203, 201, 206, 202 and 207, and 205, with respect to a previously described example, may be 0.6 seconds, 0.5 seconds, 0.4 seconds, 0.3 seconds, 0.2 seconds, 0.2 seconds, and 0.1 seconds, respectively. In the example, the determined time parameters may be determined for each of the items as a function of respective display priorities of the items. In the certain embodiments, the relationship between the time parameter for each item and the display priority of each item may otherwise be nonlinear. In an example, a determined time parameter for each of the items 204, 203, 201, 206, 202 and 207, and 205, with respect to a previously described example, may be 0.64 seconds, 0.49 seconds, 0.36 seconds, 0.25 seconds, 0.16 seconds, 0.16 seconds, and 0.0 seconds, respectively. In the example, the determined time parameters may be determined for each of the items as a function of respective display priorities of the items, in accordance with: $((\text{display priority})+0.2)^2$ [seconds].

As described with reference to FIG. 4, at step S430, where there is a current item of a plurality of items in a list to be rendered, the determination as to the current item to be rendered is made based on a display priority of the current item, relative to respective display priorities of other of the plurality of items in the list. With continued reference to FIG. 4, at step S440, the current item is added, for example, to a rendering queue, to be rendered on a display screen such as screen 200. At step S450, the time parameter, as determined for the current item, is applied in rendering the current item with respect to other of the plurality of items in the list. At step S460, operational steps 400 end when it is determined that there are no more items to be rendered. In certain embodiments of the present invention, the current item may be added, for example, to a rendering queue, to be rendered. In the certain embodiments, the current item may otherwise be rendered without being added to a rendering queue.

In certain embodiments of the present invention, rendering of items in a list forming part of a web page in a browser may be programmed and controlled using, for example, HTML, CSS, JavaScript, and the like. In the certain embodiments, the programming and control may be applied in adding an item to be rendered, or alternatively, in simply rendering the item. Where the items are rendered for display by a mobile device, various programming language types, such as web, hybrid, native, or the like, may be used. Web- and hybrid-type programming languages may use HTML, CSS, JavaScript, and the like, in programming and control of the rendering. In contrast, native-type programming languages use platform specific SDKs to develop the user interface. As may be appreciated by those of skill in the art, steps S430 and S440 may be implemented using the aforementioned programming languages, or may otherwise be implemented using other known methods and techniques, where the appropriate choice of such may depend on a particular application at hand.

In certain embodiments of the present invention, steps S440 and S450 may be implemented using, for example, lazy loading and BigPipe design techniques. Lazy loading can be implemented in front end rendering of web pages that include, for example, large amounts of images. Lazy loading may implement JavaScript to determine which images are in (or near) a viewpoint of a user, to download or fetch only the images that the user may likely see. However, the implementation of lazy loading is more focused on enhancing user experience by increasing efficiency when browsing web or search results under poor network conditions. Lazy loading may enable a web page to load data asynchronously, by way of Ajax design techniques; however, loading order may not be so easily controlled. Many E-commerce websites or image search applications have used this technology to display the images asynchronously without control. BigPipe design techniques can be implemented in dynamic front end rendering of web pages, and allows for progressive rendering at the front end. The general idea behind BigPipe is to decompose web pages into modular chunks called pagelets, and to pipeline them through several execution stages inside web servers and browsers. This is similar to the pipelining performed by most modern microprocessors: multiple instructions are pipelined through different execution units of the processor to achieve the best performance. Advantageously, while BigPipe is a fundamental redesign of the existing web serving process, it does not require changing existing web browsers or servers. Further, BigPipe is implemented entirely in PHP and JavaScript programming languages. By using a combination of both lazy loading and BigPipe design techniques, as well as other necessary processing logic, the plurality of items can be rendered in chronological order on the screen of the client.

In certain embodiments of the present invention, steps S440 and S450 may be implemented using, for example, slice-loading and BigPipe design techniques. Slice-loading can be implemented in programming and controlling rendering and display of web pages, to improve the user experience under poor network conditions by enabling efficient loading of web or search results of a web page slice-by-slice. By using a combination of both slice-loading and BigPipe design techniques, as well as other necessary processing logic, the plurality of items can be rendered in chronological order on the screen of the client.

Figure 5:
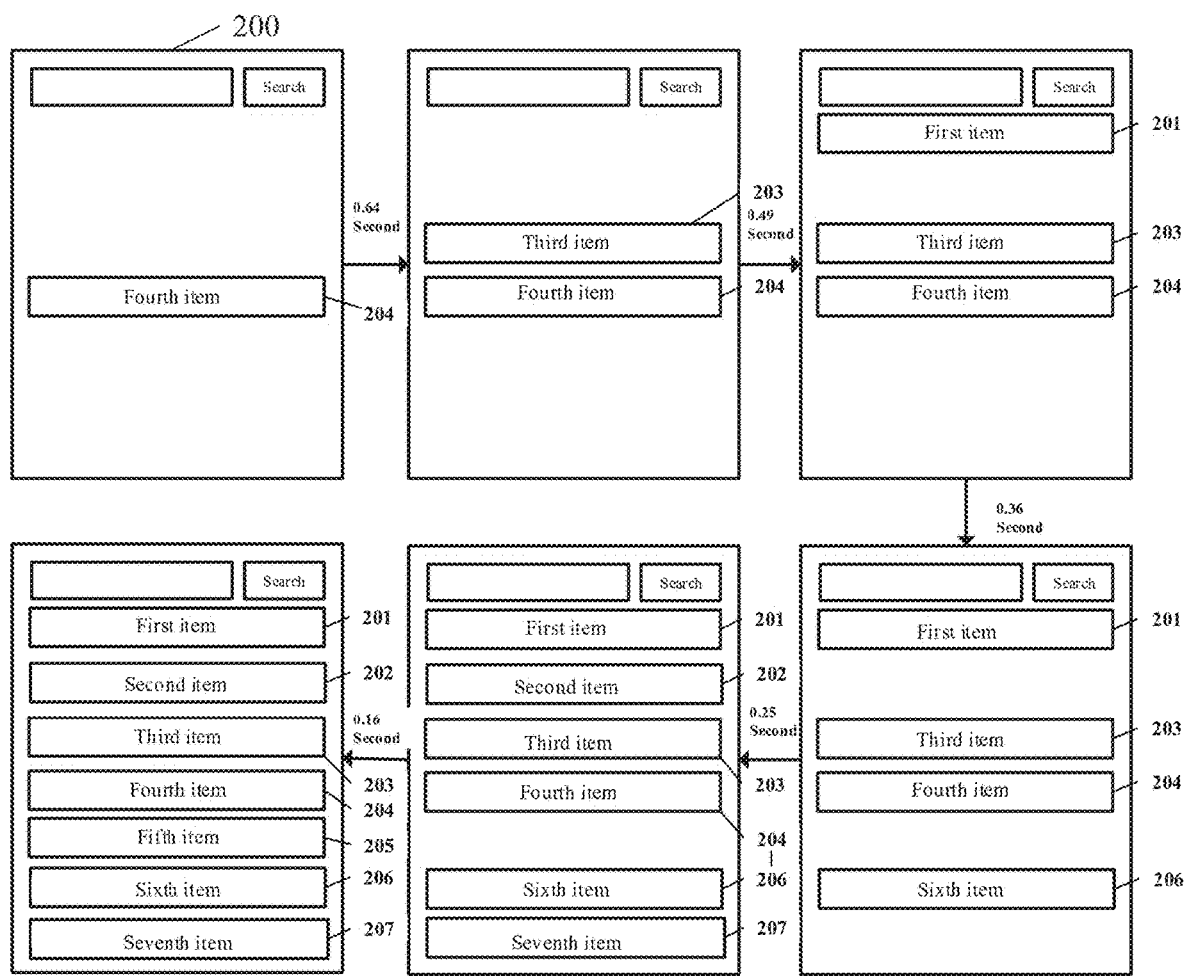
FIG. 5 depicts a sequence of screens for rendering items of a list in chronological order, in accordance with an embodiment of the present invention.

FIG. 5 depicts a sequence of screens for rendering items of a list in chronological order, in accordance with an embodiment of the present invention. As described with reference to FIG. 2, the display priorities of the items 201, 202, 203, 204, 205, 206, and 207, as shown in FIG. 2, may be 0.4, 0.2, 0.5, 0.6, 0.1, 0.3, and 0.2, respectively. Further, the corresponding display order of the items, from first to last, as determined based on the display priorities, may be 204, 203, 201, 206, 202 and 207, and 205; and the determined time parameter for each of the items, corresponding to the display order of the items, may be 0.64 seconds, 0.49 seconds, 0.36 seconds, 0.25 seconds, 0.16 seconds, 0.16 seconds, and 0.0 seconds, respectively. As shown in FIG. 5, item 204 may be rendered first in position 4 on a first screen, and may include a time parameter affecting 0.64 seconds of delay before a subsequent rendering may occur. Item 203 may subsequently be rendered second in position 3 on a second screen, and may include a time parameter affecting 0.49 seconds of delay before another subsequent rendering may occur. Item 201 may subsequently be rendered third in position 1 on a third screen, and may include a time parameter affecting 0.36 seconds of delay before another subsequent rendering may occur. Items 206, 202, 207, and 205 may each be subsequently rendered accordingly, and may each include respective time parameters. As shown in FIG. 5, already rendered items, such as item 204, may be added and kept to be rendered in respective positions in relation to subsequently rendered items, such as in the case of item 204 with respect to item 203. Further, already added items to be rendered, such as item 203, may be kept to be rendered in respective positions in relation to subsequently rendered items, such as in the case of item 203 with respect to item 201. In certain embodiments of the present invention, both the original search order of the items and the display order of the items may be applied. Generally, the original search results can be ordered by search rating of an item in the search results list, so as to keep the relevance, impartiality, or authority of the search results. Implementing the method in accordance with the present disclosure with respect to the original search results, as shown in FIG. 5, can obscure any visually perceptible interference of the display order of the items in the search results, making them unobvious. Therefore, a keyword auction, for example, that is implemented in accordance with the present disclosure, may provide advertising results among search results that may effectively support promotional marketing efforts of a business, while also decreasing the likelihood of negative perception that may occur as a result.

Figure 6:
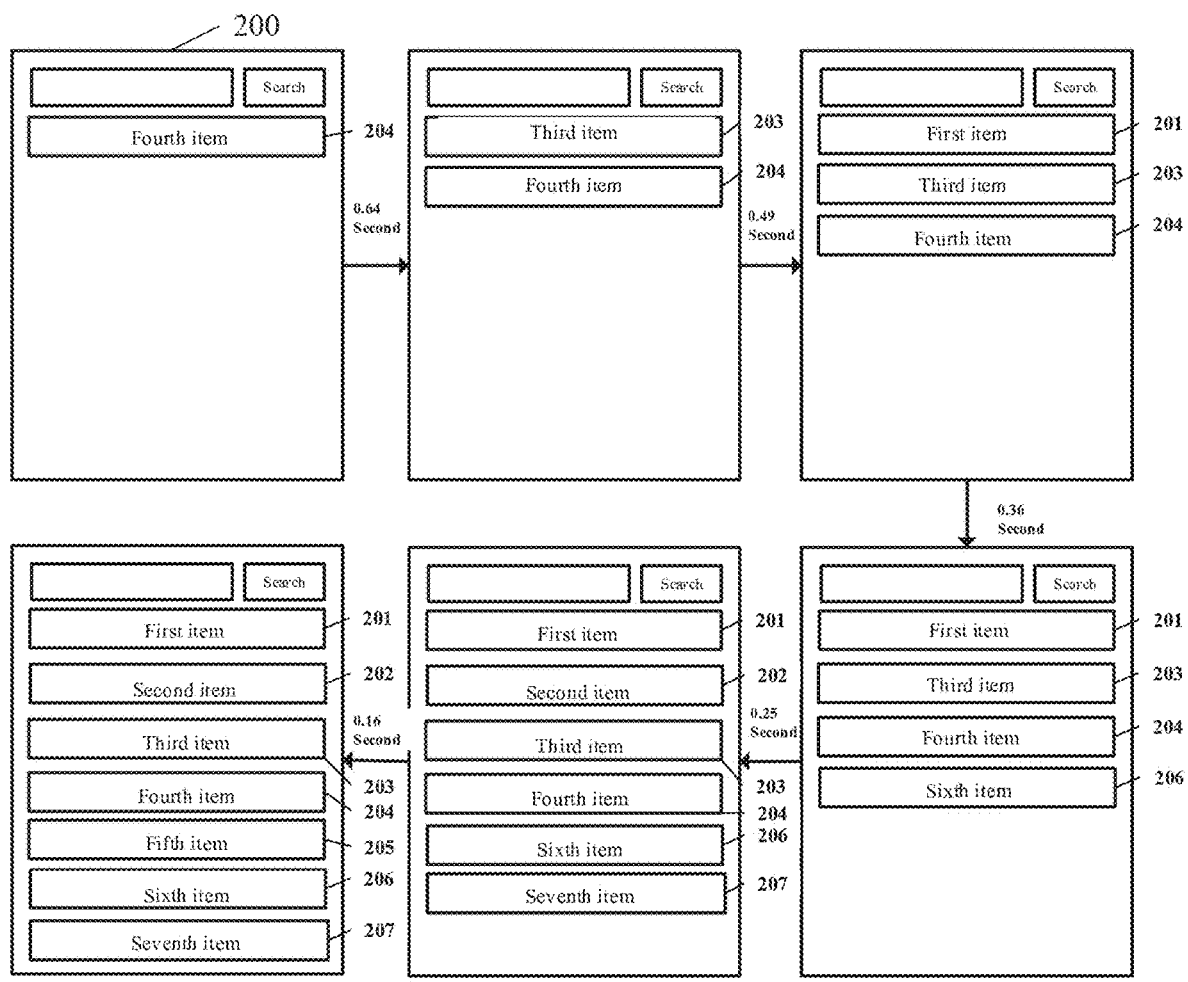
FIG. 6 depicts a sequence of screens for rendering items of a list in chronological order, in accordance with an embodiment of the present invention.

FIG. 6 depicts a sequence of screens for rendering items of a list in chronological order, in accordance with an embodiment of the present invention. As described with reference to FIG. 5, with respect to the reference to FIG. 2, the display priorities of the items 201, 202, 203, 204, 205, 206, and 207, as shown in FIG. 2, may be 0.4, 0.2, 0.5, 0.6, 0.1, 0.3, and 0.2, respectively; the corresponding display order of the items, from first to last, as determined based on the display priorities, may be 204, 203, 201, 206, 202 and 207, and 205; and the determined time parameter for each of the items, corresponding to the display order of the items, may be 0.64 seconds, 0.49 seconds, 0.36 seconds, 0.25 seconds, 0.16 seconds, 0.16 seconds, and 0.0 seconds, respectively. As shown in FIG. 6, item 204 may be rendered first in position 1 on a first screen, and may include a time parameter affecting 0.64 seconds of delay before a subsequent rendering may occur. Item 203 may subsequently be rendered second in position 1 on a second screen, and may include a time parameter affecting 0.49 seconds of delay before another subsequent rendering may occur. As shown, the rendering of item 203 in position 1 may cause item 204 to be moved to position 2. Item 201 may subsequently be rendered third in position 1 on a third screen, and may include a time parameter affecting 0.36 seconds of delay before another subsequent rendering may occur. As shown, the rendering of item 201 in position 1 may cause item 203 to be moved to position 2, and item 204 to be moved to position 3. Items 206, 202, 207, and 205 may each be subsequently rendered accordingly, and may each include respective time parameters. Similar to that described with reference to FIG. 5, already rendered items may be added and kept to be rendered in respective positions in relation to subsequently rendered items, and already added items to be rendered may be kept to be rendered in respective positions in relation to subsequently rendered items. In certain embodiments of the present invention, both the original search order of the items and the display order of the items may be applied. Similar to that described with reference to FIG. 5, the original search results can be ordered by search rating of an item in the search results list, so as to keep the relevance, impartiality, and authority of the search results. FIG. 6 describes an alternative implementation of an embodiment of the present invention, with respect to that of FIG. 5.

In certain embodiments of the present invention, instead of adding a current item to, for example, a rendering queue to be rendered, the current item may simply be rendered on a display screen without first being added. In the certain embodiments, the display screen may then be held in accordance with the time parameter, as determined for the current item. With reference to FIG. 4, the aforementioned correspond to steps S430, S440 and S450. That is, if a current item is to be rendered, as determined at step S430, then step S440 may be replaced by rendering the current item on the display screen, and step S450 may be replaced by holding the display screen for a period of time, as indicated by the time parameter of the current item. Similar to that described with reference to FIG. 4, by using a combination of both slice-loading and BigPipe design techniques, as well as other necessary processing logic, the plurality of items can be rendered in chronological order on the screen of the client.

Figure 7:
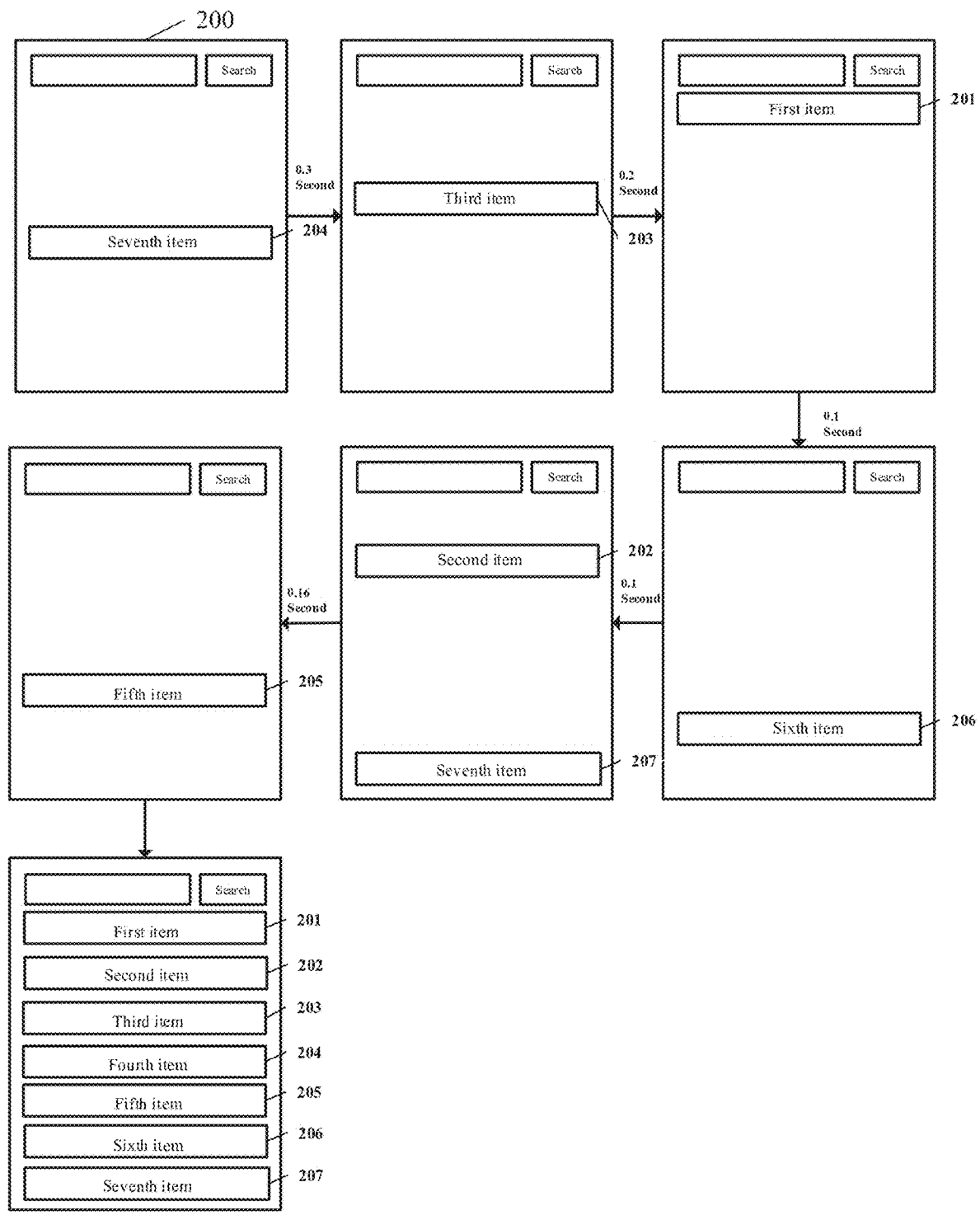
FIG. 7 depicts a sequence of screens for rendering items of a list in chronological order, in accordance with an embodiment of the present invention.

FIG. 7 depicts a sequence of screens for rendering items of a list in chronological order, in accordance with an embodiment of the present invention. As described with reference to FIG. 4, the display priorities of the items 201, 202, 203, 204, 205, 206, and 207, may be 0.4, 0.2, 0.5, 0.6, 0.1, 0.3, and 0.2, respectively; the corresponding display order of the items, from first to last, as determined based on the display priorities, may be 204, 203, 201, 206, 202 and 207, and 205; and the determined time parameter for each of the items, corresponding to the display order of the items, may be 0.3 seconds, 0.2 seconds, 0.1 seconds, 0.1 seconds, 0.16 seconds, 0.16 seconds, and 0.0 seconds, respectively. As shown in FIG. 7, item 204 may be rendered first in position 4 on a first screen, and may include a time parameter affecting 0.3 seconds of delay before a subsequent rendering may occur. Item 203 may subsequently be rendered second in position 3 on a second screen, and may include a time parameter affecting 0.2 seconds of delay before another subsequent rendering may occur. As shown, the rendering of item 203 on the second screen may prevent or prohibit the rendering of item 204 on the second screen as well. Item 201 may subsequently be rendered third in position 1 on a third screen, and may include a time parameter affecting 0.1 seconds of delay before another subsequent rendering may occur. As shown, the rendering of item 201 on the third screen may prevent or prohibit the rendering of items 204 and 203 on the third screen as well. Items 206, 202, 207, and 205 may each be subsequently rendered accordingly, and may each include respective time parameters. In certain embodiments of the present invention, both the original search order of the items and the display order of the items may be applied. Similar to that described with reference to FIG. 5, the original search results can be ordered by search rating of an item in the search results list, so as to keep the relevance, impartiality, and authority of the search results. FIG. 7 describes an alternative implementation of an embodiment of the present invention, with respect to those of FIGS. 5 and 6.

Figure 8:
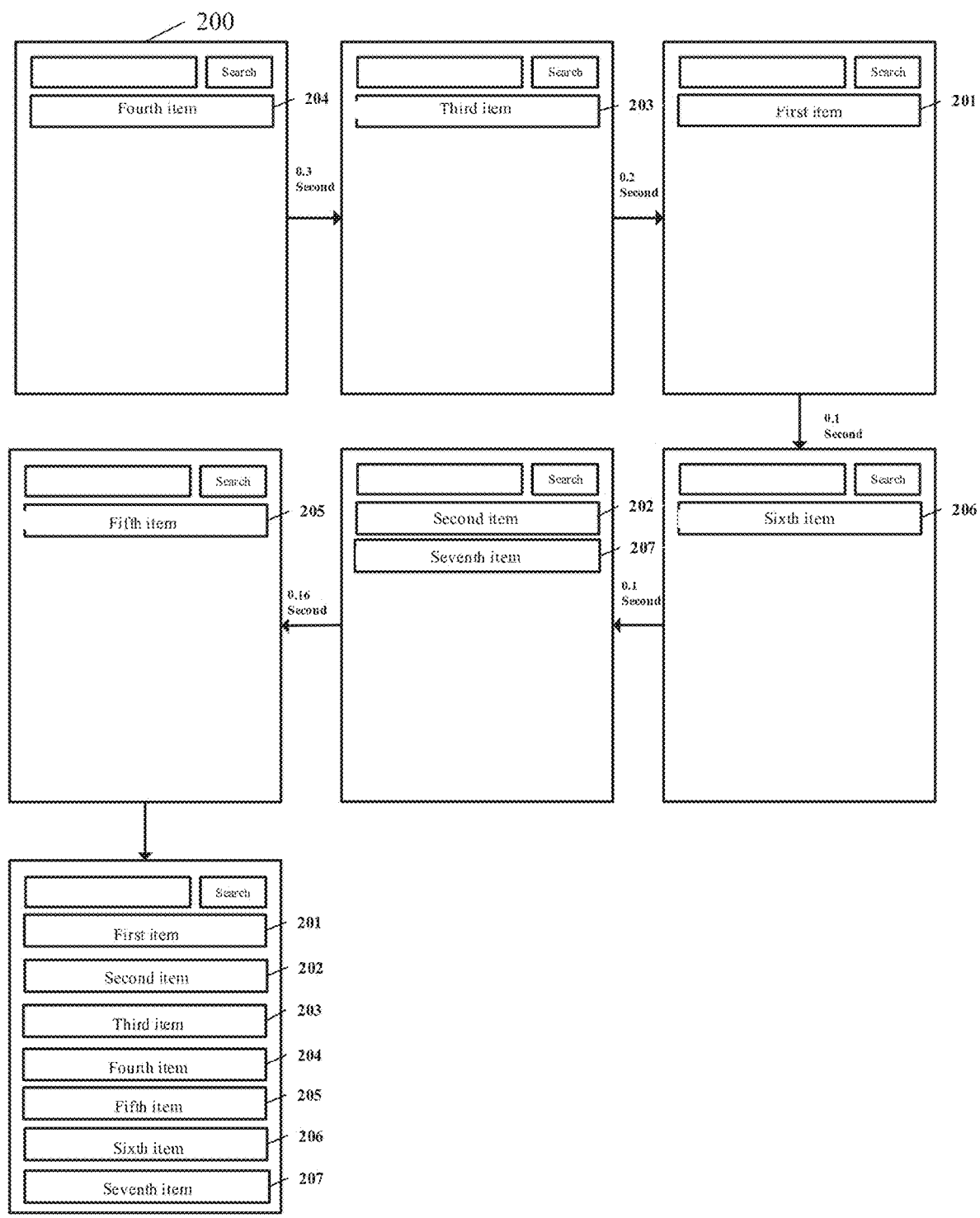
FIG. 8 depicts a sequence of screens for rendering items of a list in chronological order, in accordance with an embodiment of the present invention.

FIG. 8 depicts a sequence of screens for rendering items of a list in chronological order, in accordance with an embodiment of the present invention. As described with reference to FIG. 4, the display priorities of the items 201, 202, 203, 204, 205, 206, and 207, may be 0.4, 0.2, 0.5, 0.6, 0.1, 0.3, and 0.2, respectively; the corresponding display order of the items, from first to last, as determined based on the display priorities, may be 204, 203, 201, 206, 202 and 207, and 205; and the determined time parameter for each of the items, corresponding to the display order of the items, may be 0.3 seconds, 0.2 seconds, 0.1 seconds, 0.1 seconds, 0.16 seconds, 0.16 seconds, and 0.0 seconds, respectively. As shown in FIG. 8, item 204 may be rendered first in position 1 on a first screen, and may include a time parameter affecting 0.3 seconds of delay before a subsequent rendering may occur. Item 203 may subsequently be rendered second in position 1 on a second screen, and may include a time parameter affecting 0.2 seconds of delay before another subsequent rendering may occur. As shown, the rendering of item 203 on the second screen may prevent or prohibit the rendering of item 204 on the second screen as well. Item 201 may subsequently be rendered third in position 1 on a third screen, and may include a time parameter affecting 0.1 seconds of delay before another subsequent rendering may occur. As shown, the rendering of item 201 on the third screen may prevent or prohibit the rendering of items 204 and 203 on the third screen as well. Items 206, 202, 207, and 205 may each be subsequently rendered accordingly, and may each include respective time parameters. In certain embodiments of the present invention, both the original search order of the items and the display order of the items may be applied. Similar to that described with reference to FIG. 5, the original search results can be ordered by search rating of an item in the search results list, so as to keep the relevance, impartiality, and authority of the search results. FIG. 8 describes an alternative implementation of an embodiment of the present invention, with respect to those of FIGS. 5, 6 and 7.

In certain embodiments of the present invention, for items to be rendered having respective display priorities and corresponding display orders, the items may all be rendered on a display screen at once. In the certain embodiments, each of the items having display orders after a current item may be rendered transparently, and other of the items (e.g., the current item) may be rendered non-transparently. With reference to FIG. 4, the aforementioned correspond to steps S430 and S440. That is, step S440 may be replaced by a step in which all of the items, except for the current item, are rendered transparently on the display screen, and the current item is rendered non-transparently on the display screen.

In certain embodiments of the present invention, the plurality of items may be divided into groups, where a group may include items having the same, or equal, display priorities. In the certain embodiments, the groups may be divided based on, for example, particular interests of users, where the particular interests may be of varying scope. In an example, a particular group may include particular items that may all be within the scope of a particular topic of interest. In the example, a user may search for a book about cooking, by submitting a keyword phrase such as "cooking book" to a search application. In the example, the user's personality may indicate a preference for both Chinese food and cold food. In the example, a list of search results may then include a group of items including items related to books about making dumplings, books about making spring rolls, and the like, and another group of items including items related to books about making sushi, books about making ice cream, and so on. In certain other embodiments, the groups may alternatively or additionally be divided based on, for example, properties of items included in the groups, respectively. In the certain other embodiments, the properties may include, for example, rankings of the items. In an example, a certain group may include certain items having the same, or equal, user rankings. In the example, a user may search for a restaurant to visit, by submitting a keyword such as "restaurant" to a search application. In the example, a list of search results may then include a group of items including items related to restaurants having user rankings such as in the form of "a 95% overall rating," and another group of items including items related to restaurants having user rankings such as in the form of "a 90% overall rating, and so on. In other embodiments, the groups may alternatively or additionally be divided based on, for example, promotion level. In the other embodiments, a particular promotion level may be based on, for example, an amount of payment of a service charge received by an administrator or vendor of a search application from a business, for purposes relating to promotional marketing of items of the business to be rendered by the search application. In the other embodiments, the service charge may include various levels, defined by corresponding amounts of payment, where the predefined amounts of the payment may be used in determining a corresponding promotion level. In an example, a specific group may include specific items for which the service charge may be $1,000, and another group may include other items for which the service charge may be $500, and so on. In the example, where a user may thereafter search for a restaurant to visit, a list of search results may then include a group of items including items of the $1,000 promotion level, and another group of items including items of the $500 promotion level, and so on.

Figure 9:
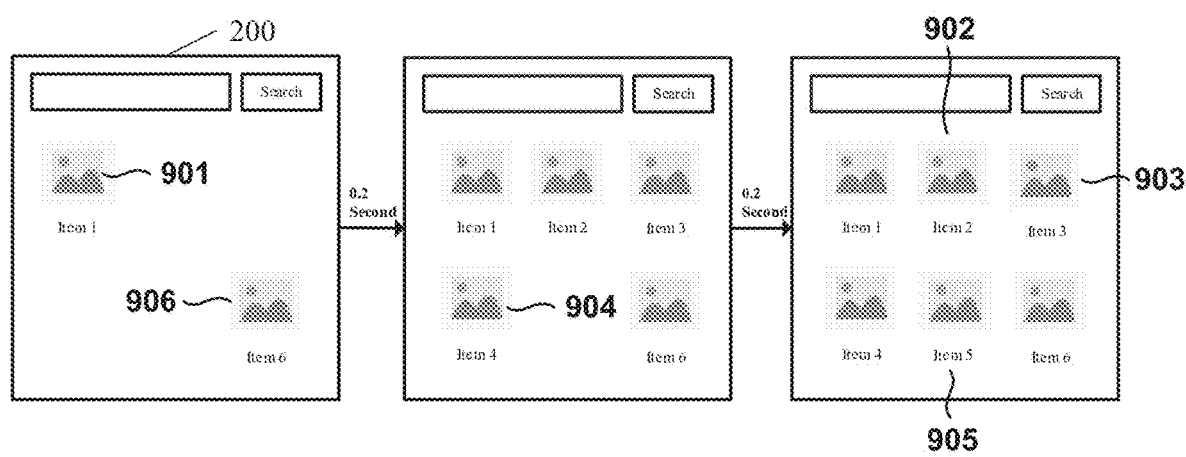
FIG. 9 depicts a sequence of screens for rendering groups of items of a list in chronological order, in accordance with an embodiment of the present invention.

FIG. 9 depicts a sequence of screens for rendering groups of items of a list in chronological order, in accordance with an embodiment of the present invention. The display priorities of items 901, 902, 903, 904, 905, and 906, corresponding to items 1, 2, 3, 4, 5, and 6, respectively, as shown in FIG. 9, may be 0.3, 0.2, 0.2, 0.2, 0.1, and 0.3, respectively; a corresponding display order of the items, from first to last, as determined based on the display priorities of the items, may be (1 and 6), (2 and 3 and 4), and 5, respectively; and a corresponding determined time parameter for each of the items, corresponding to the display order of the items, may be 0.2 seconds, 0.2 seconds, 0.2 seconds, 0.2 seconds, 0.2 seconds, and 0.0 seconds, respectively. As shown in FIG. 9, items 1 and 6 may form a group that may be rendered first on a first screen, and may each include a time parameter affecting 0.2 seconds of delay before a subsequent rendering may occur. Items 2, 3, and 4 may form another group that may be rendered second on a second screen, and may each include a time parameter affecting 0.2 seconds of delay before a subsequent rendering may occur. Item 5 may be rendered third on a third screen, and may include a time parameter affecting 0.0 seconds of delay before a subsequent rendering may occur.

In certain embodiments of the present invention, if operational steps 300 are implemented and executed, for example, by a display controller of server 210, various asynchronous communications may be used to send entries of a screen to render at specific time points. In the certain embodiments, the entries of the screen to render at the specific time points may be sent piece by piece. In the certain embodiments, by using, for example, WebSocket or the like, the display controller may decide when and which data to send to the client. Thus, the display controller may control the display order of items. However, due to network latency, if precise time parameters between entries is required, this might not be the best solution.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In certain embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the present invention has been disclosed by way of example for purposes of illustration, and not limitation.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
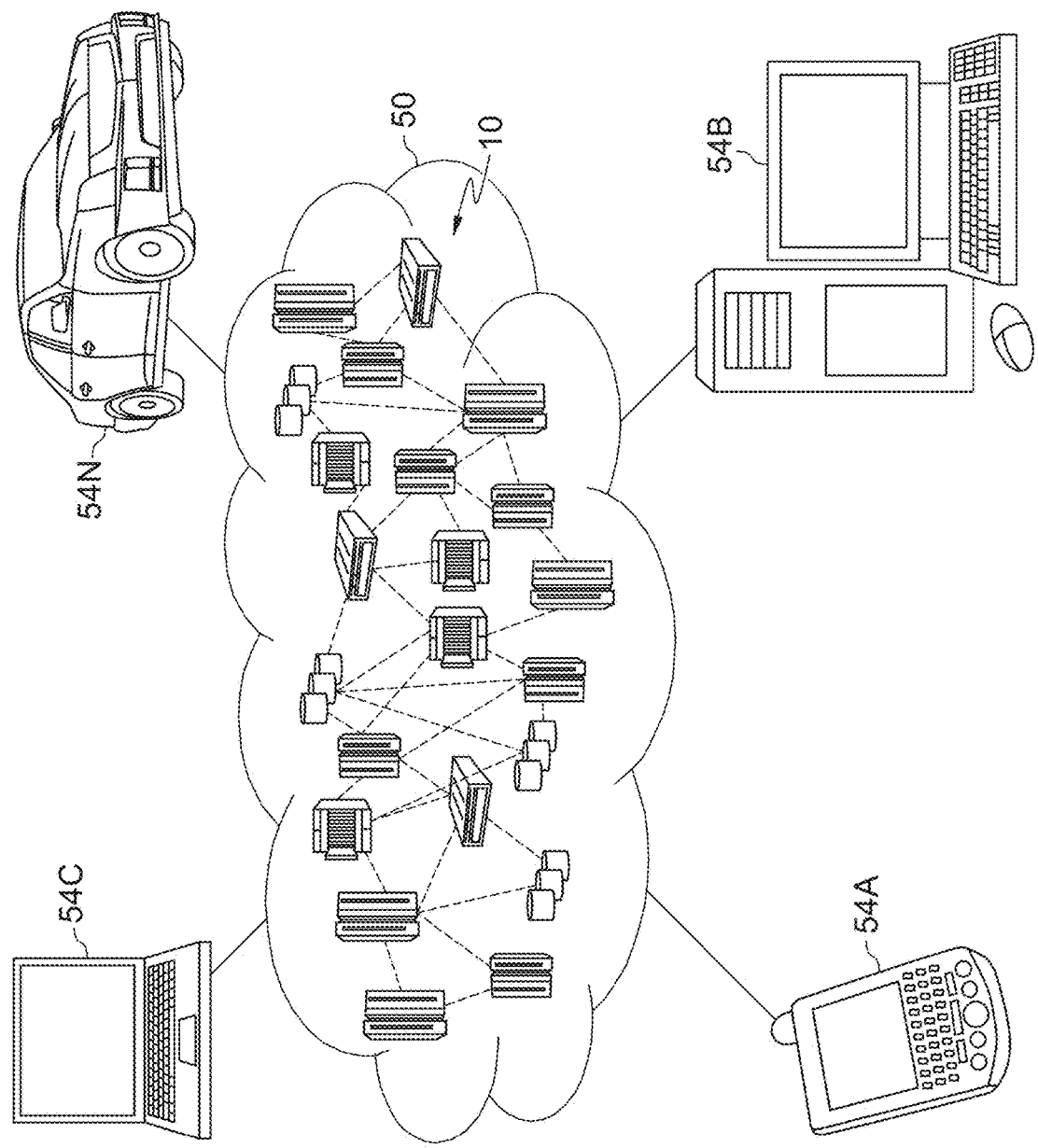
FIG. 10 depicts a cloud computing environment, in accordance with an embodiment of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
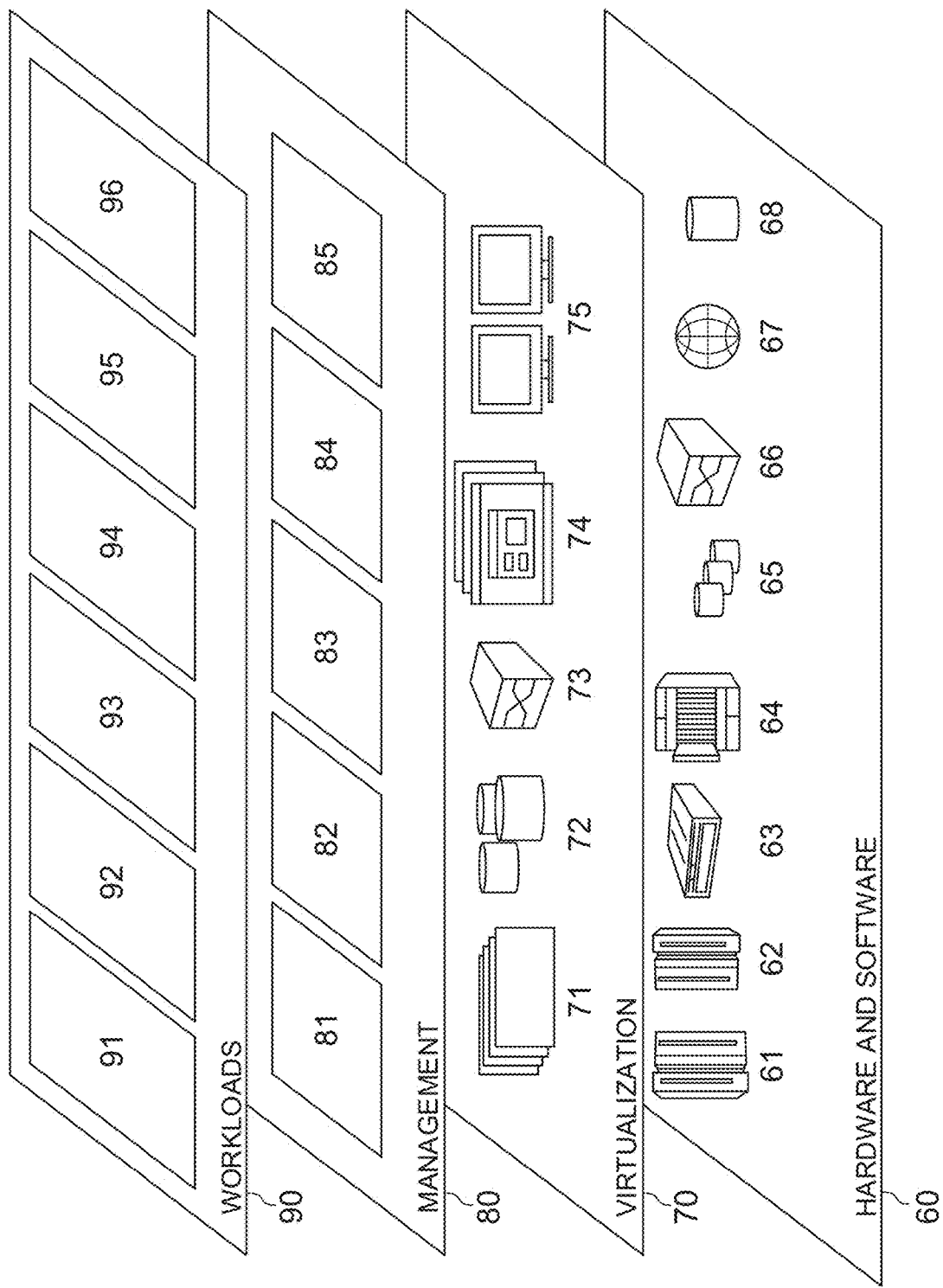
FIG. 11 depicts abstraction model layers, in accordance with an embodiment of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In certain embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and chronological list-item rendering 96.

What is claimed is:

1. A method comprising:
receiving, by a computer system, a list of items to be rendered on a display screen; determining, by the computer system, a display priority of each item in the list based on past behavior of a user;

determining, by the computer system, a time parameter for each item in the list based on the respective display priority of each item in the list, wherein the time parameter is a holding time for each item with respect to its rendering on the display screen, wherein the holding time is a span of time during which an item is rendered and during which time the item is the only item being rendered, wherein the holding time is a span of time longer than that of a users persistence of vision, which is in the range from 0.1 seconds to 0.9 seconds, to allow for the user to perceive an order;

determining, by the computer system, a position of each item in the list to be rendered on the display screen based on an original search order defined by a search application; and rendering, by the computer system, on the display screen each item in the list of items in the determined position, in a sequence according to the determined display priority of each item and the determined holding time for each item in the list, wherein displaying a subsequent item to be rendered according to the determined display priority is delayed for a period of time based on the determined holding time for a previous item to be rendered, wherein lazy loading technique is implemented to determine which items are in or near a viewpoint of the user and download or fetch only items that the user may likely see, wherein slice-loading technique is implemented in programming and controlling rendering and display of a web page by enabling efficient loading of each item in the list on the web page slice-by-slice, wherein the lazy loading technique and the slice-loading technique are utilized to increase efficiency when the user browses web search results under poor network conditions.

2. The method according to claim 1, further comprising: prolonging, by the computer system, the rendering of the current item on the display screen for a period of time based on the determined time parameter for the current item.

3. The method according to claim 1, wherein determining the current item in the list to be rendered comprises:
ordering, by the computer system, each item in the list based on the display priority of each item in the list.

4. The method according to claim 1, wherein the list of items form two groups of items, each comprising items of equal display priority.

5. The method according to claim 1, wherein each item in the list of items is selected from a group consisting of: image, video, and text.

6. The method according to claim 1, wherein delaying the rendering of the current item comprises use of one or more of lazy loading and BigPipe.

7. The method according to claim 6, wherein delaying the rendering of the current item further comprises use of slice-loading.

8. A computer system comprising:
one or more computer processors, one or more computer-readable storage media, and program instructions stored on one or more of the computer-readable storage media for execution by at least one of the one or more computer processors, the program instructions, by the at least one of the one or more computer processors, comprising:
receiving, by a computer system, a list of items to be rendered on a display screen; determining, by the computer system, a display priority of each item in the list based on past behavior of a user;
determining, by the computer system, a time parameter for each item in the list based on the respective display priority of each item in the list, wherein the time parameter is a holding time for each item with respect to its rendering on the display screen, wherein the holding time is a span of time during which an item is rendered and during which time the item is the only item being rendered, wherein the holding time is a span of time longer than that of a user's persistence of vision, which is in the range from 0.1 seconds to 0.9 seconds, to allow for the user to perceive an order;

determining, by the computer system, a position of each item in the list to be rendered on the display screen based on an original search order defined by a search application and rendering, by the computer system, on the display screen each item in the list of items in the determined position, in a sequence according to the determined display priority of each item and the determined holding time for each item in the list, wherein displaying a subsequent item to be rendered according to the determined display priority is delayed for a period of time based on the determined holding time for a previous item to be rendered, wherein lazy loading technique is implemented to determine which items are in or near a viewpoint of the user and download or fetch only items that the user may likely see, wherein slice-loading technique is implemented in programming and controlling rendering and display of a web page by enabling efficient loading of each item in the list on the web page slice-by-slice, wherein the lazy loading technique and the slice-loading technique are utilized to increase efficiency when the user browses web search results under poor network conditions.

9. The computer system according to claim 8, the method further comprising:
prolonging, by the computer system, the rendering of the current item on the display screen for a period of time based on the determined time parameter for the current item.

10. The computer system according to claim 8, wherein determining the current item in the list to be rendered comprises:
ordering, by the computer system, each item in the list based on the display priority of each item in the list.

11. The computer system according to claim 8, wherein the list of items form two groups of items, each comprising items of equal display priority.

12. The computer system according to claim 8, wherein each item in the list of items is selected from a group consisting of: image, video, and text.

13. The computer system according to claim 8, wherein delaying the rendering of the current item comprises use of one or more of lazy loading and BigPipe.

14. The computer system according to claim 13, wherein delaying the rendering of the current item further comprises use of slice-loading.

15. A computer program product comprising:
one or more computer-readable storage devices and program instructions stored on at least one of the one or more computer-readable storage devices for execution by at least one or more computer processors of a computer system, the program instructions, by the at least one of the one or more computer processors, comprising:
receiving, by a computer system, a list of items to be rendered on a display screen; determining, by the computer system, a display priority of each item in the list based on past behavior of a user;
determining, by the computer system, a time parameter for each item in the list based on the respective display priority of each item in the list, wherein the time parameter is a holding time for each item with respect to its rendering on the display screen, wherein the holding time is a span of time during which an item is rendered and during which time the item is the only item being rendered, wherein the holding time is a span of time longer than that of a user's persistence of vision, which is in the range from 0.1 seconds to 0.9 seconds, to allow for the user to perceive an order;

determining, by the computer system, a position of each item in the list to be rendered on the display screen based on an original search order defined by a search application; and rendering, by the computer system, on the display screen each item in the list of items in the determined position, in a sequence according to the determined display priority of each item and the determined holding time for each item in the list, wherein displaying a subsequent item to be rendered according to the determined display priority is delayed for a period of time based on the determined holding time for a previous item to be rendered, wherein lazy loading technique is implemented to determine which items are in or near a viewpoint of the user and download or fetch only items that the user may likely see, wherein slice-loading technique is implemented in programming and controlling rendering and display of a web page by enabling efficient loading of each item in the list on the web page slice-by-slice, wherein the lazy loading technique and the slice-loading technique are utilized to increase efficiency when the user browses web search results under poor network conditions.

16. The computer program product according to claim 15, the method further comprising:

prolonging, by the computer system, the rendering of the current item on the display screen for a period of time based on the determined time parameter for the current item.

17. The computer program product according to claim 15, wherein determining the current item in the list to be rendered comprises:

ordering, by the computer system, each item in the list based on the display priority of each item in the list.

18. The computer program product according to claim 15, wherein the list of items form two groups of items, each comprising items of equal display priority.

19. The computer program product according to claim 15, wherein each item in the list of items is selected from a group consisting of: image, video, and text.

20. The computer program product according to claim 15, wherein delaying the rendering of the current item comprises use of one or more of lazy loading and BigPipe.

21. The computer program product according to claim 20, wherein delaying the rendering of the current item further comprises use of slice-loading.

* * * * *